3 Sheets—Sheet 1.

A. W. & C. T. KENDRICK.
Grain-Separator.

No. 198,986.  Patented Jan. 8, 1878.

Witnesses:

Inventors
Andrew W. Kendrick
Charles T. Kendrick
By his Attorney
Andrew W. Kendrick 3 Sheets—Sheet 2.

A. W. & C. T. KENDRICK.
Grain-Separator.

No. 198,986. Patented Jan. 8, 1878.

Witnesses:
T. C. Brecht
DeWitt C. Allen

Inventors
Andrew W. Kendrick
Charles T. Kendrick
By his Attorney
Andrew W. Kendrick 3 Sheets—Sheet 3.
A. W. & C. T. KENDRICK.
Grain-Separator.
No. 198,986. Patented Jan. 8, 1878.
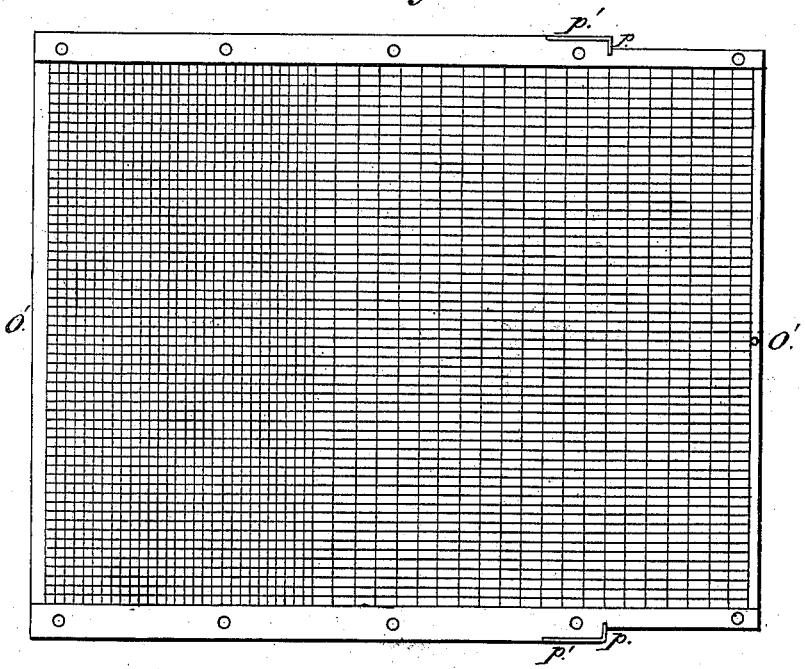
Fig. 7.
Fig. 8.
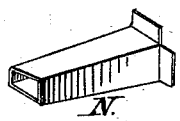
Fig. 9.
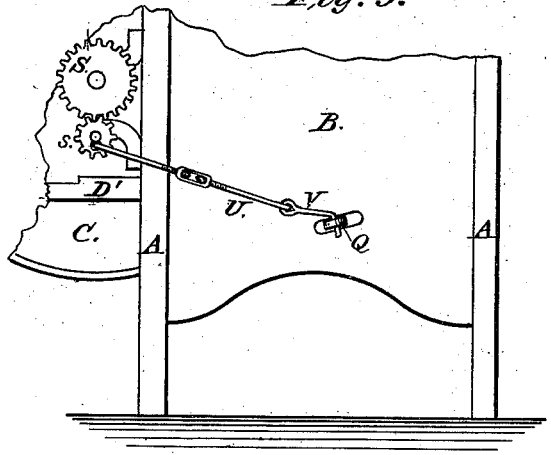
Fig. 10.
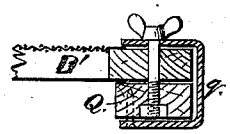
Witnesses:
T. C. Brecht
DeWitt C. Allen
Inventors
Andrew W. Kendrick
Charles T. Kendrick
By his Attorney
Andrew W. Kendrick
N. PETERS, PHOTO-LITHOGRAPHER, WASHINGTON, D. C.

UNITED STATES PATENT OFFICE.

ANDREW W. KENDRICK AND CHARLES T. KENDRICK, OF BROOKLYN, N. Y.

IMPROVEMENT IN GRAIN-SEPARATORS.

Specification forming part of Letters Patent No. 198,986, dated January 8, 1878; application filed November 12, 1877.

*To all whom it may concern:*

Be it known that we, ANDREW W. KENDRICK and CHARLES T. KENDRICK, of the city of Brooklyn, county of Kings, and State of New York, have invented certain new and useful Improvements in Fanning-Mills for Separating and Cleaning Grain, Seeds, &c.; and we do hereby declare the following to be a full, clear, and exact description of the same, reference being had to the accompanying drawings, making part of the same, in which—

Figure 1:
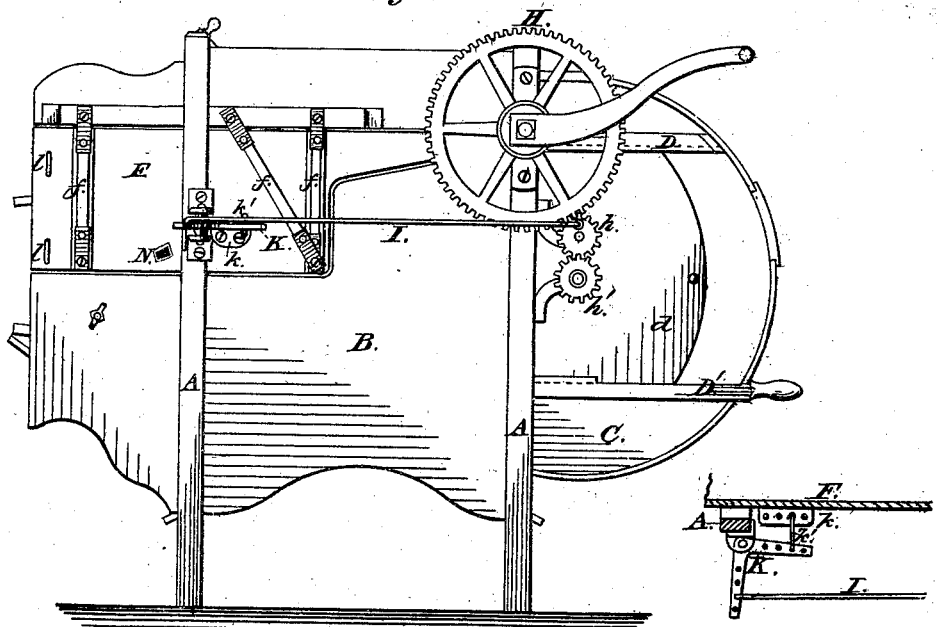
Figure 2:
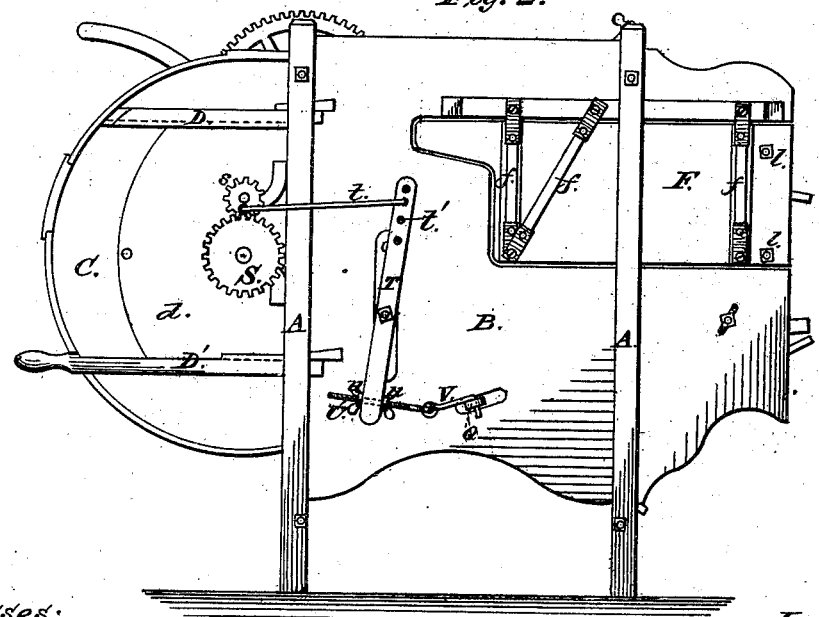
Figure 3:
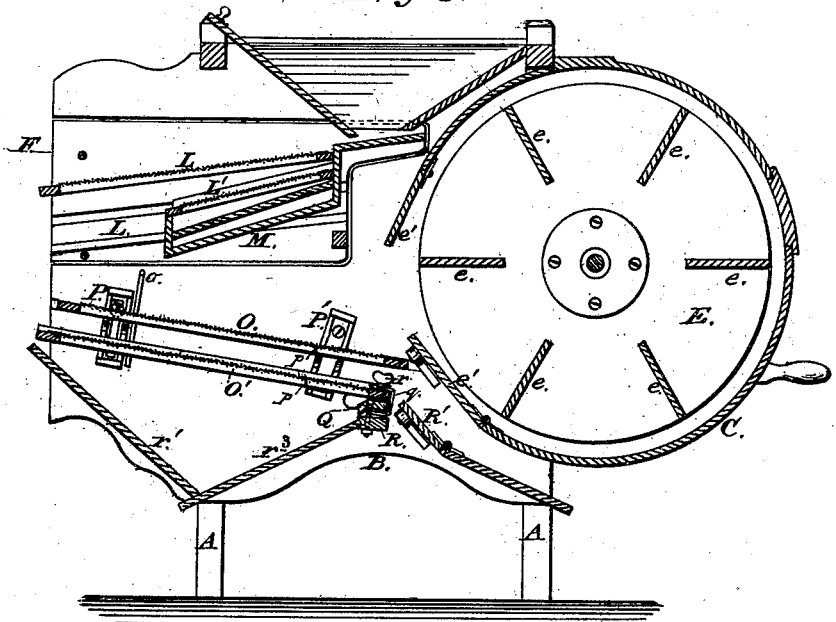
Figure 4:
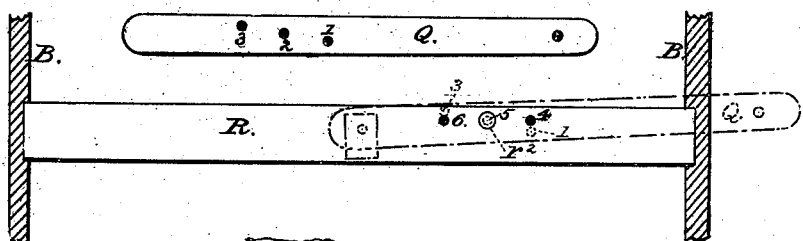
Figure 5:
Figure 6:
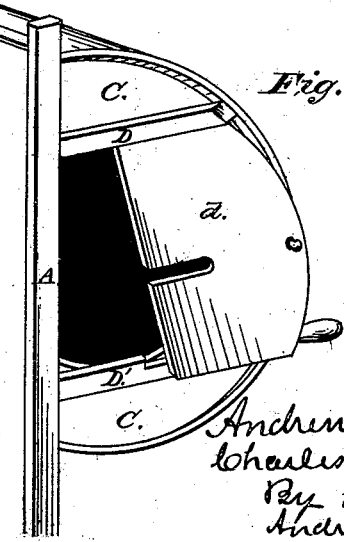

Figure 1 is a side elevation of a machine embodying our improvements, showing the drive-wheel and mechanism for operating the shoe. Fig. 2 is an elevation of the opposite side of the mill, showing the mechanism through which the lower screens are actuated. Fig. 3 is a longitudinal vertical section of the machine, showing the general internal arrangement and the means of supporting and actuating the lower screens. Fig. 4 is a sectional detail view, nearly in plan, showing the horizontal lever actuating the lower screens, and the mode of pivoting and adjusting said lever. Fig. 5 is a detail view of one of the suspensory-straps for the shoe. Fig. 6 is a detail perspective view of one of the fan-doors in the moment of removal; Fig. 7, a detail view of one of the screens in the lower part of the mill, showing the double screening-surface and the bumping-shoulders formed at each side of the screen-frame, and armed with metallic plates; Fig. 8, a detail view of the discharge-spout of the screening-box of the upper shoe. Fig. 9 shows an optional modification of the means of actuating the lower screens. Fig. 10 is a detail sectional view of the pivotal connection of screen O' and lever Q.

Our invention relates to certain improvements in grain and seed separators; and these improvements consist—

First, in a novel mode of constructing the straps by which the shoe containing the upper sieves or screens is suspended.

Second, in a novel construction of the discharge-spout of the screen-box of the shoe, whereby said spout is quickly and conveniently applied, securely held in position, and easily detached.

Third, in an adjustable bracket by which the shoe is connected to the adjustable elbow-lever, giving it motion.

Fourth, in the arrangement, in connection with the shoe, of a screen in the lower part of the mill, for taking oats from barley and wheat, said screen having a shorter mesh at the upper or receiving end than on the rest of its surface, which is long meshed, and adapted to allow the escape through it of oats, while retaining barley and wheat, the whole screen being of one continuous fabric.

Fifth, in imparting to a screen of this description an endwise reciprocation, the forward movement terminating in a sudden stoppage or bump, for producing the even distribution and longitudinal position of the grains, which is essential to the elimination of the oats or such like long narrow grain, or bodies.

Sixth, in a peculiar mode of adjusting the fulcrum of the horizontal lever imparting motion to the lower screens, said adjustment being designed to alter the throw of the screens, and at the same time avoid changing the limit of their downward movement and their impact at that point against the bumpers or detents.

Seventh, in the combination, with said reciprocating screen or screens, which strike, at the end of their downward movement, against a fixed detent or bumper, of suitable mechanism for imparting reciprocating motion, and a connection, adjustable as to its length, for the purpose of adjusting the screens nearer to and farther away from the bumpers or detents, and thus modifying the force with which they strike the detents, without changing the throw or length of stroke of said screens.

Eighth, in the combination, with our specific arrangement of the crank-wheel, the connecting-rod, the upright lever outside the mill, and the horizontal lever actuating the screens against the bumpers inside the mill, of the connecting-rod, adjustable as to length, which connects the upright or outside lever with the horizontal or inside lever, for the purpose of conveniently regulating the force of the jar from the outside of the mill without needing to disturb the screens or supports inside, which involves greater difficulty and delay.

Ninth, in the combination, with the reciprocating screens and fixed detents, of the adjustably-fulcrumed horizontal lever, the connecting-rod, adjustable as to its length, and the cranked shaft or pinion, or other equivalent means of imparting reciprocation, for the purpose of modifying, according to the requirements of the case, the conducting, sifting, and distributing action of the screen upon the grain.

Tenth, in the combination, with the upright lever, having one of its limbs adjustable as to length for the purpose of varying the throw of the screens, of the connecting-rod, adjustable as to its length, which adjustability serves in this relation to correct the effect of the upright lever on the jar or bump of the screens. This external adjustment supplements and extends that of the horizontal lever inside, which may be adjusted, before starting the mill or inserting the screens, to the kind or condition of grain, &c., to be cleaned, while the external adjustment may be manipulated while working the mill, with only a moment's stoppage.

Eleventh, in arming the offsets or shoulders, formed by cutting away portions of the side pieces of the screen-frames, with metallic face-plates, for the double purpose of preventing wear or splitting, and of forming, in conjunction with the metallic supporting blocks or detents, a device which imparts a sharper and more sudden shock than that given by wood upon wood, or wood and metal.

Twelfth, in the combination, with a screen reciprocating in the line of the flow of the grain, of a fixed detent, against which said screen, or a projecting part thereof, strikes at the end of each of its movements, the throw or length of reciprocation being adjustable in such a manner that one of the limits of the reciprocation remains fixed, and the variation in the length of throw takes place at the other end—that is, the screen has a variable throw, one of the limits being fixed and the other varied—for the purpose of obviating the necessity of adjusting the bumpers or detents at every change of the throw.

Thirteenth, and finally, our invention consists in a screen operating in connection with a fixed bumper or detent, and provided with means for varying, independently of each other, the length of the reciprocation and the force of its impact against the fixed bumper.

A A are the uprights of the mill, to which is secured the casing B. Frame and casing may be put together in a "knock-down" construction to facilitate transportation.

C is the fan-drum, detachably connected to the uprights A by the horizontal bars D D', to which the open heads of the drum are fastened, and which are grooved, respectively, on their adjacent faces to receive fan-doors $d$. The front wall of the groove in the lower bar D' is cut away from the overlapping edge of the drum toward the upright for a distance equal to the width of the fan-door, which is applied by inserting the upper edge in the groove in bar D and setting the lower edge in upon the bar D', when it may be slid back and forth in the grooves to regulate the supply of wind. The projecting edge of the drum prevents its being drawn out beyond its outline and being in the way.

F is the shoe, suspended by straps $f$, constructed as follows: The body of the strap, excepting a small portion at either end, is of sheet metal. The ends are of leather of sufficient stiffness for the purpose, riveted or otherwise rigidly secured to the metal straps, and their extremities fastened by rivets or other suitable fastenings to the casing of the mill and the shoe, respectively.

We have found in practice that straps made entirely of sheet metal sustain most of the strain at a point near where they are fastened to the mill or shoe, where the direct bending of the strap by the to-and-fro motion of the shoe and the torsion strain of putting in and taking out the sieves, screening-box, &c., finally cracks the strap across at these points.

To obviate this we make the end portions of stiff leather, so as to obtain the benefit of both materials. Were the straps entirely of leather they would not resist the thrust and pull of inserting and removing the sieves. The sheet-metal straps, moreover, ease and steady the motion of the shoe.

The leather sections are not long enough to yield laterally, and are of sufficient thickness to call the flexibility of the metal into play.

At the inner or feed end of the shoe we use two straps at each side, fastened separately to the mill at top, and together to the shoe at their lower end by a single pin or rivet. This answers the purpose of steadying and guiding the shoe. We may also use two instead of the single one shown at the rear end of the shoe on either side.

The hand-crank and driving-pinion H are mounted on the opposite side of the mill from where the power is usually applied, so that the operator can observe the working of the mill and regulate the feed, blast, &c. The pinion H engages a small crank-pinion, $h$, perforated to receive the bent end of rod I, the other end of which hooks into one of the adjustment-holes of the outer limb of horizontal elbow-lever K journaled in brackets; and the other limb, similarly perforated, of lever K is connected by a link, $k'$, with a bracket, $k$, secured to the side of the shoe F in a position corresponding with that of the inner limb of the elbow-lever. It corresponds also in the number and arrangement of adjustment-holes, so that they are, as nearly as may be, opposite to those of the limb of the lever. (See detail connected with Fig. 1.)

When the adjustment of link $k'$ is changed upon the lever K, it is correspondingly changed in the bracket $k$, so that the pull and push of the lever are given directly to the shoe, and not obliquely, as is the case where there is no adjustment of the bracket, thus rendering the throw more accurately determined and effective, and relieving the suspenders of the torsional strain, the effects of which on the ordinary metal strap have been described.

The sieve or screens L, of which there may be any desired number and kind, are held in the shoe by strain-rods $l$, as is also screen L' and screening-box M. The spout N, for discharging seeds and other small matters from the box M, is made of sheet metal, nearly square in cross-section and tapering lengthwise outwardly, and is thrust from inside the screening-box through an opening made in the lower rear corner thereof, its tapering form wedging it tightly in. The top side and inner front side of the inner end of the spout are bent outward, as shown, forming a shoulder or partial flange which prevents any seed from escaping, except by the spout, and also holds the spout firmly in place, so that it cannot be dislocated or loosened by any motion of the shoe. The spout projects to the outside of the mill through an opening in the wall of the shoe. It aids also, by engaging as a key with the shoe, to hold the screening-box in place.

Additional fastenings, besides being more expensive, are liable to work loose in the agitation of the shoe.

The fan-shaft is driven through a pinion, $h'$, and its engaging-pinion $h$. We have shown a fan, E, composed of a central partition-disk and fan-blades $e$ mounted thereon. The blades $e$ are straight. Wind-boards $e'$ $e'$, hinged to the top and bottom edges of the drum, may be employed to deflect and concentrate the blast upon the screens.

The lower screens O O' are supported at the rear upper end upon grooved metallic blocks P, slotted to be adjusted by means of bolt and thumb-nut, the blocks P being slotted lengthwise through the middle, and at the rear upon grooved metallic blocks or detents P', which project inwardly beyond the surface of the casing. The screens O O' are made to fill the entire space, except where they are cut away to pass the detents P', where they form shoulders $p$, covered with face-plates of metal, which strike, at the end of every movement in the direction of the flow of the grain, against the metallic detents P', producing a sharp vibration which greatly facilitates the screening, the forward movement of the screen being checked so sharply and suddenly that the inertia of the grain causes it to slide on instead of stopping with the screen. The plates $p'$ serve also to keep the striking-faces true and to protect the screen-frames. The screens O O' are held together by locking-pins $o$, and receive their endwise reciprocation from horizontally-vibrating lever Q.

The U-formed clevis $q$, by which the screen O' is held down upon and steadied by the lever Q, to which said screen is pivotally connected, may be described as follows: It is readily connected with the screen by a thumb-nut or a screw-threaded bolt, $r$, instead of a simple pivot-pin. This bolt passes through the upper limb of the clevis, the screen-frame, and the lever Q into a nut firmly embedded in or formed with the lower limb of the clevis, which is itself rigidly secured to the lever Q. The bolt is thus prevented from getting loose or working out in the rapid vibrations of the lever. The clevis $q$, however, may be dispensed with, and the screen simply attached to lever Q by a screw-threaded bolt passing through the screen-frame and lever Q, and engaging with a nut firmly embedded in the under side of the lever. The horizontally-vibrating lever Q extends little more than halfway across the mill, with the clevis $q$ at its extremity, and fulcrumed adjustably upon the cross-bar R. A number of adjustment-holes, 4 5 6, in a straight line parallel with the length of bar R, and exactly at right angles with the reciprocation of screens O O', and a corresponding number, 1 2 3, in the lever Q, serve for the introduction of a pivot-bolt, $r^2$, afterward secured by a nut. The line of holes 1 2 3 in the lever Q is oblique to the line of the lever, however, so that when the inner arm of lever Q is lengthened by changing the fulcrum the body of the lever is set nearer to the screens, so that in their rearward movement their greater throw is compensated by this setting of the lever nearer to them, and they stop at the same point, their shoulders striking the detents, as in their shorter throw; and when the length of the inner limb of lever Q is shortened the screens O O' are drawn farther down by the oblique adjustment, preserving in their shorter throw their relation to the blocks or detents P'.

The screen O', receiving the grain from the upper sieves, is made of a single piece of wire-cloth, about nine inches of the upper end being of a mesh shorter (though of the same width) than the rest, the mesh of which is of a length and width to permit the escape through of oats, but too narrow for wheat or barley of the normal size. Through the upper end, as the mingled grain falls from the upper sieves a distance, perhaps, of nine or ten inches, the finer impurities and very small grain may escape; but the wheat and oats or barley and oats have time to get evenly spread, and assume the longitudinal position under the longitudinal shaking and jar before it passes upon the long-meshed part of the screen, when the oats will fall through. Were the long-meshed portion continued all the way up to the receiving end, the grain falling from above would, much of it, be wedged endwise between the wires, which tend to spring apart under the impact, and the screen would speedily choke. Were a board used instead of the short mesh, so much screening-surface would be lost, and much grain in falling would rebound and be wasted, or would roll and drift onto the long meshes without being spread or assuming the longitudinal position necessary; and if the screen were made of two distict pieces of wire-cloth, united, as is common, upon a cross-piece of the frame, not only would so much of the screening-surface be cut off, but it would be so interrupted by the jagged edges, gaps, and fastening-tacks as to prevent the even spread, and the cross-piece and wire-cloth together would form pockets, cleats, &c., for the lodgment of various matters, which would defeat the purpose of eliminating the oats.

Our screen, as it is, presents a continuous screening and spreading surface, the texture of which, under the motion imparted of endwise reciprocation and jar, continually works the grains into proper position for thorough screening. The lower end of screen O projects beyond that of screen O', and a hinged trap-door or cut-off, R', when lowered, as shown in the section, runs all the grain from both the screens O O' under the front end, and when raised, as shown in dotted lines, deposits the contents of screen O' beneath the mill, forming two grades, as desired.

The rear side of cross-bar R is gained or grooved, as shown in the section, and the board $r^3$ forming the front side of cheat-box, the rear side of which is formed by the movable slide $r^1$.

The horizontal lever Q is operated from a large pinion, S, on the end of the fan-shaft opposite the drive-wheel, and meshing with a crank-pinion, $s$, above it, which connects, through rod $t$, with a vertical lever, T, fulcrumed, about in the middle, to the side of the mill. The upper limb of the lever may be lengthened or shortened by means of adjustment-holes $t'$. A link, V, flexibly connected with the end of horizontal lever Q, (which projects through a slot in the casing,) is connected to the screw-threaded rod U, which passes transversely through the lower end of lever T, and is adjusted back and forth, and held rigidly therein, by the adjusting-nuts $u\, u$, by which the lever Q is made to set the screens farther up or lower down in the mill, and the force of their strokes against the detents P' is increased or diminished; or, by a proper degree of adjustment, they may be made to reciprocate without striking the detents at all.

By adjusting rod $t$ higher or lower in lever T the jar or bump of the screens and their throw are adjusted at once. By altering the position of screw-rod U the bump of the screens is modified, so that the throw and the knock can both be modified without stopping the mill as long as is required to adjust lever Q; but by adjusting lever Q beforehand for the kind and condition of grain to be cleaned, no more than slight changes in the outside adjustment will be required. All three adjustments supplement or extend the other.

In constructing our mill, lever T might be dispensed with, and the crank-pinion $s$ set below pinion S, and a simple pitman-connection, adjustable as to length, made between pinion $s$ and lever Q, as clearly shown in Fig. 9.

Having described our invention, we claim—

1. The suspensory-straps for the shoe, constructed of sheet metal as to their main portion, and a portion of their length at either end made of leather, substantially as and for the purposes set forth.

2. The combination, with the screen-box having an opening in the side, of a tapering sheet-metal discharge-spout, adapted to be applied from within, and provided with flanges or a shoulder, constructed and operating substantially as set forth.

3. The combination, with the elbow-lever having the adjustable arm, of the adjustable bracket attached to the shoe opposite to said lever-arm and the connecting-link, substantially as and for the purpose set forth.

4. The combination, with the upper shoe or screens of a grain or seed separator, of a screen for separating long and narrow grains from the shorter and thicker grains, formed of a single piece of wire-cloth, presenting a continuous screening and distributing surface, said screen having a short mesh upon its upper or receiving portion, and upon the remainder a long mesh parallel with the length of the screen, substantially as herein set forth.

5. A screen having a continuous screening and distributing surface of wire-cloth, having finer meshes at one end and coarser meshes running lengthwise of the screen over the rest of its surface, in combination with mechanism, substantially as described, for giving it an endwise reciprocating motion, terminating in its forward movement with a sudden stoppage and jar, substantially as and for the purpose set forth.

6. The combination, with the shouldered screen and the stationary detents, of the lever having an oblique line of adjustment-holes for its pivot, and the bearing-bar having a right line of adjustment-holes, substantially as set forth.

7. The combination, with a reciprocating screen striking a fixed bumper at the limit of its reciprocation, of a crank-shaft for imparting the motion, and a link, adjustable as to its length, for regulating the force of the stroke of the screen against the bumper, substantially as set forth.

8. The combination of the crank-wheel, the link, the vertical lever T, the horizontal lever Q, actuating the screen against the fixed bumpers, and the connecting-rod, made adjustable in length, substantially as set forth.

9. The combination of the reciprocating screen, the adjustably-fulcrumed lever, the connecting-rod, adjustable in length, and the crank-shaft, substantially as set forth.

10. The combination, with the metallic detents supporting the screens, of the shouldered screen, having the metallic face-plates on the striking-faces of its shoulders, substantially as set forth.

11. The combination of the adjustable upright lever T, the connecting-rod, made adjustable as to its length, the shouldered screen O, and the detents, substantially as set forth.

12. The combination, with the longitudinally-reciprocating screen, of a fixed bumper, against which said screen strikes at the end of its movement in the direction of flow of the grain, said screen being adjustable as to one of the limits of its throw, while the other remains unchanged, substantially as set forth.

13. A longitudinally-reciprocating screen, operating in connection with a fixed bumper, and provided with means, substantially as described, for varying independently the length of its reciprocation and the force with which it strikes the fixed bumper, substantially as and for the purpose set forth.

ANDREW W. KENDRICK.
CHARLES T. KENDRICK.

Witnesses:
DE WITT C. ALLEN,
JOHN J. DARBY.